Aug. 31, 1926.
E. C. HOUCHEN
MANURE AND LIME DISTRIBUTOR
Filed Dec. 21, 1925   2 Sheets-Sheet 1
1,598,198
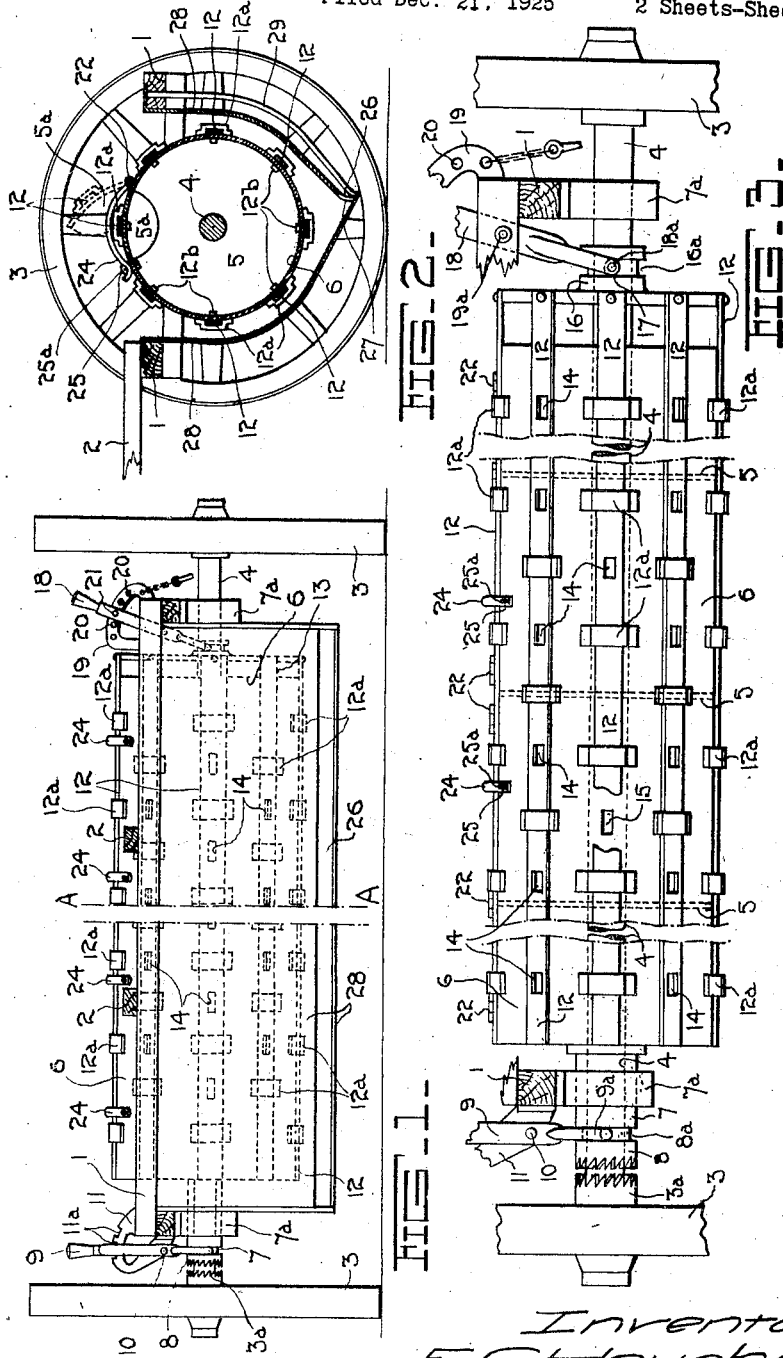
Inventor
E. C. Houchen
by Langner, Parry, Card & Langner
Attys.

Aug. 31, 1926.

E. C. HOUCHEN 1,598,198

MANURE AND LIME DISTRIBUTOR

Filed Dec. 21, 1925    2 Sheets-Sheet 2

Inventor
E. C. Houchen
by Langner, Parry, Card & Langner
Attys.

Patented Aug. 31, 1926.

1,598,198

UNITED STATES PATENT OFFICE.

EDWARD CHARLES HOUCHEN, OF HAMILTON, AUCKLAND, NEW ZEALAND.

MANURE AND LIME DISTRIBUTOR.

Application filed December 21, 1925, Serial No. 76,883, and in New Zealand December 11, 1924.

This invention relates to means employed for distributing manure, lime and the like over areas of land, and has for its object the provision of improved apparatus for the aforesaid purpose.

The improved apparatus, which is of the type mounted on running wheels and adapted to be drawn by horses or a tractor, comprises a container for the manure, lime or the like, provided with a clutch and operating lever by means of which said container may be caused to rotate with the wheels, or the latter allowed to run without rotating the container.

Holes in the container are adapted to be opened and closed by means of apertured or holed shutters or bars, slidable along the container and attached to a disc movable along the axle by a hand lever, in order that the apertures or holes in said shutters or bars may be made to register either completely or partially with the holes in the container to allow of the contents of the latter escaping therefrom at the desired rate, as the container is rotated by the wheels and so that the holes in the container may when required be completely closed by the shutters or bars to prevent the contents of the container issuing therefrom.

Alternative means for controlling the escape of the container's contents consists in mounting longitudinally grooved or fluted rollers adjacent to longitudinal slots in the container through which manure, lime or the like is passed, the rollers being adapted to be given intermittent turning movement about their own axes by means of toothed wheels or pinions on their spindles being caused to mesh with a rack or racks by the rotation of the container as the distributor is moved along on its running wheels.

While the rollers remain stationary they close the slots in the container, but when given turning movement by engagement of the pinions on their spindles with the rack or racks, they open said slots and permit the escape of the manure, lime or the like from the container, the opening of the slots taking place prior to the time when the latter reach their lowermost positions.

In order that the invention may be better understood it will be further described in conjunction with the accompanying drawing, wherein:—

Figure 1 is a front view of the improved apparatus,

Figure 2 a vertical section on the line A—A Figure 1, and

Figure 4:
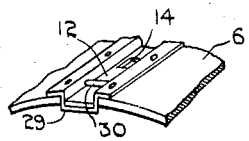
Figure 5:
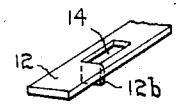

Figure 3 an elevation of the container and the sliding bars or shutters and the clutch operating mechanism, Figure 4 is a part perspective view of the container illustrating a modification, Figure 5 is a part perspective view of a shutter or bar showing a slot or opening therein, and a projection or spur thereon.

Figure 6:
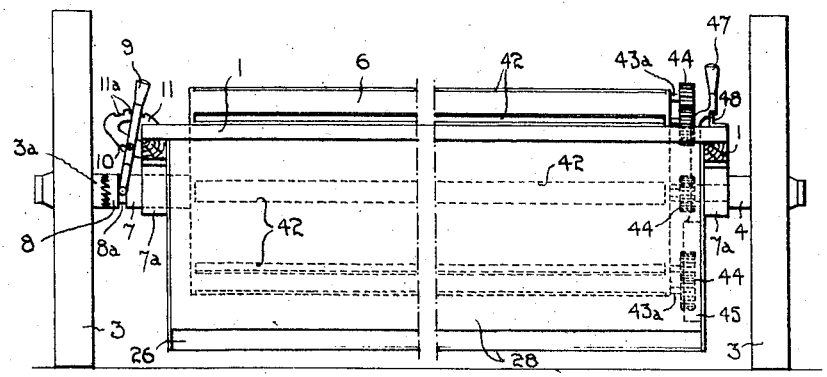
Figure 7:
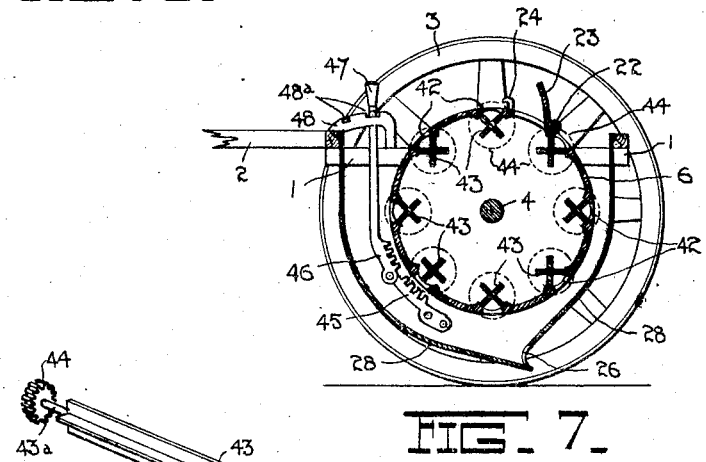
Figure 8:

Figure 6 is a rear elevation of the improved apparatus fitted with the modified means for controlling the escape of the manure, lime or the like, Figure 7 is a cross sectional elevation of the apparatus illustrated in Figure 6, while Figure 8 is a perspective view of one of the rollers.

The distributor comprises a frame 1 provided with a pole 2, and mounted on running wheels 3, the axle 4 of which passes through the ends, and the partitions 5 of a container 6, which may be circular or of any other desired shape in cross section.

The container 6 is capable of being made to rotate with the wheels 3 as the apparatus is moved along, or said wheels may turn without rotating the container 6.

A sleeve 7 having at one end a clutch portion 8 and surrounding the axle 4 is attached to one end of the container 6 and passes through one of the bearings $7^a$ on the frame 1, said clutch portion 8 containing a circumferential groove $8^a$ in which engages the forked end $9^a$ of a lever 9, fulcrumed at 10 on the frame 1.

The running wheel 3 at the same end of the container 6 as the clutch portion 8 is provided with a clutch portion $3^a$ with which the clutch portion 8 may be engaged by operating the lever 9 to slide the sleeve 7 and container 6 along the axle 4, whereupon the container 6 and wheel 7 will rotate together when the apparatus is drawn or moved along on the wheels 3.

The lever 9 preferably works over a rack 11 provided with depressions $11^a$ into which said lever can be sprung for the purpose of maintaining the clutch portions 8 and $3^a$ in their engaged or separated positions.

The container 6 has spaced around its outer surface a number of flat bars or shutters 12 which extend the full length of the container, parallel with the axis thereof, these bars or shutters 12 being attached at one end to a sliding disc 13 on the axle 4 and being slidable in guides 12ª on the outer surface of said container.

The bars or shutters 12 contain slots or openings 14, and work over holes 15 in the container 6, and are capable of being operated so that the slots or openings 14 may be made to register with the holes 15 in the container.

The disc 13 has attached thereto or formed integral therewith a boss 16 containing a circumferential groove 16ª in which are entered pins 17 inserted in the forked end 18ª of the lever 18 fulcrumed at 19ª on the frame 1.

By operating the lever 16 the disc 13 may be moved along the axle 4 to cause the slots or openings 14 in the bars or shutters 12 to either completely or partially register with the holes 15 in the container 6, or so that said bars or shutters 12 will close or cover said holes 15.

The lever 18 works over a frame 19 mounted on the frame 1, said frame 19 containing a series of holes 20, and the lever 18 a hole 21, so that by inserting a pin in the hole 21 and a selected hole of the series of holes 20, the bars or shutters 12 may be maintained in a desired position on the container 6.

A section of the container 6 is hinged at 22 to the remainder in order to provide a door 23 which may be opened to permit the material to be distributed, to be placed in the container. The door 23 contains holes 15, and has a bar or shutter 12 attached thereto, and is adapted to be secured in its closed position by means of straps or bars 24 hinged to the container 6, and shaped to clear the sliding shutter or bar 12 thereon, and adapted to be secured across the latter by means of pins 25 entered in lugs 25ª on the container 6. The attachment of the bar or shutter 12 on said door 23, to the disc 13, also assists in securing the door in its closed position.

In order to open said door 23 it is necessary to detach the bar or shutter 12 thereon from the disc 13 in addition to disengaging the straps or bars 24 from the lugs 25ª and swinging them clear of the door.

The partitions 5 in the container 6 are provided to strengthen the container 6 and also to prevent the contents of the latter from shifting all to one end thereof when the distributor is worked across sloping ground, and preferably a segment 5ª of each partition 4 is secured to the door 23, so that when the latter is opened, the shifting of material from one compartment to the other of the container 6 will be facilitated.

Secured to the frame 1 are metal sheets 28 bent to a hopper formation in which the container 6 is positioned, and provided at its lowest point with a horizontal slot or opening 26 extending the full length of the container 6. Material escaping from the container 6 falls between the sheets 28 and is discharged through the slot 26 rearwards of the machine. The use of the metal sheets 28 is optional, the object of their provision being to prevent the material which leaves the container from being blown about.

The sheets 28 are preferably joined together by connections 27 and supported from the frame 1 by stays 29.

The bars or shutters 12 are provided with projections 12ᵇ which are entered in holes 15 and by moving said bars or shutters 12 the projections 12ᵇ serve to clear the holes 15 should they become clogged.

In use, the container 6 is filled with the material or combination of materials to be distributed. If a mixture of materials is being used, the holes 15 are left closed, and the clutch portions 3ª and 8, engaged with each other, whereupon when the apparatus is drawn along on its wheels 3 the container 6 will be rotated and the materials thoroughly mixed.

The escape of the contents of the container 6 from the latter is regulated by moving the bars or shutters 12 to cause the slots or openings 14 thereon to either completely or partially register with the holes 15, according to the rate at which it is desired said contents shall escape.

In effecting distribution of the contents of the container 6, the latter is caused through the medium of the clutch portions 3ª and 8 to rotate with the wheels 3 as the machine is drawn along, the escaping material dropping either directly on to the ground, or if the metal sheets 28 are used, into the hopper formation provided thereby and being delivered rearwards through the slot 26 onto the ground, as the machine is travelling.

If it is desired to use a coarse material some of the sliding bars or shutters 12 can be disconnected from the disc 13, and left covering the holes 15 over which they work, the other bars or shutters 12 being adjusted so that the slots or openings 14ª therein open the holes 15 over which they work, to the desired extent to allow the coarse material to pass.

The discharge or delivery of the material from the machine can be varied at will, even while the latter is travelling to suit patches of ground of varying qualities, by merely adjusting the bars or shutters 12 through the medium of the lever 18.

In a modification the holes in the container 6 can be located in channel shaped formations 29 in the latter, the bars or shutters 12 with the slots or openings 14 therein working in said channel shaped formations 29 and being retained therein by cross pins 30 (Figure 4).

Alternative means for regulating the escape of the material from the container 6 comprise longitudinal slots 42 spaced around the outer surface of the container 6, and preferably extending for the full length of the latter.

Immediately behind each of the slots 42 and within the container 6 is mounted a roller grooved or fluted or built to an X section, each roller extending the full length of the slot and being adapted when in its stationary position to completely close the latter.

These rollers 43 close the slots 42 during the time they are not in use when two of their arms or vanes contact with the sides of the slots 42 as shown.

The roller spindles pass at one end through the end of the container 6 and have secured on their projecting ends 43$^a$ toothed wheels or pinions 44.

A section of the container 6 is hinged at 52 to the remainder in order to provide a door 53 which can be opened to permit the material to be placed in said container. Suitable catches 54 are provided for securing the door 53 in its closed position.

A rack 45, a fixture against rotation on a suitable portion of the apparatus, is so positioned that as the container 6 rotates, each of the pinions 44, at a certain point in the rotation of the container, is engaged with said rack whereby the rollers 43 are in turn given partial turning movement so that as each slot 42 reaches a position opposite the rack 45, and just prior to its coming to its lowermost position, the roller 43 closing it is partially rotated to open the slot and allow a proportion of the material in the container to pass through the slot 42 to be delivered onto the surface of the ground over which the apparatus is being drawn.

Where it is desired that an increased proportion of material should escape from the container 6 at each turning movement of a roller 43, a further section of toothed rack 46 is hinged on the apparatus, the additional section 46 being fitted with a lever 47 whereby it can be moved into or out of the line of travel of the pinions 44. By this means the amount of turning movement to be imparted to each roller 43 at every rotation of the container 6 can be regulated. The hinged rack 46 can be used alone if desired.

The lever 47 is provided with a rack 48 formed with depressions 48$^a$ into which said lever 47 can be sprung to hold the rack section 46 in or out of the line of travel of the pinions 44 as desired.

The rollers 43 in addition to opening and closing the slots 42 in the container 6, act as stirrers to assist in keeping the material in said container evenly distributed therein besides which they prevent clogging of the slots 42.

If desired, the rollers 43 can be mounted on and around the outside of the container 6 instead of inside the latter, their operation being the same as hereinbefore described.

Having now described my invention, I do hereby declare that what I claim, and desire to obtain by Letters Patent of the United States of America, is:—

A lime and manure distributor including vehicle wheels in spaced relation at the ends of an axle, and a perforated container transversely slidable therebetween, shutters slidably mounted relative to said container for occluding the perforations of said container, a clutch for connecting said container to one of said wheels including an element fixed relative to said wheel and a slidable element fixed to said container, means for sliding said container and the clutch element fixed thereto, into engagement with the clutch element fixed relatively to said wheel, and separate means mounted independently of said container for sliding said shutters relatively to said container regardless of whether the latter is in clutched or declutched position, for determining the degree of occlusion of said peforations by said shutters in any transverse position of said container, said means being effective to determine the degree of opening which said perforations shall assume when said container and shutters are automatically relatively shifted through the shifting of said container by said clutching means.

Signed at Auckland, in the Provincial District of Auckland, in the Dominion of New Zealand, this 17th day of November, 1925.

EDWARD CHARLES HOUCHEN.